United States Patent
Martin

(10) Patent No.: US 7,033,536 B2
(45) Date of Patent: Apr. 25, 2006

(54) METHOD FOR THERMOFORMING

(75) Inventor: James Martin, Beaverton, MI (US)

(73) Assignee: Brown Machine, LLC, Beaverton, MI (US)

(*) Notice: Subject to any disclaimer, the term of this patent is extended or adjusted under 35 U.S.C. 154(b) by 348 days.

(21) Appl. No.: 10/361,155

(22) Filed: Feb. 7, 2003

(65) Prior Publication Data
US 2004/0113329 A1 Jun. 17, 2004

Related U.S. Application Data

(60) Provisional application No. 60/432,175, filed on Dec. 11, 2002.

(51) Int. Cl.
*B29C 51/04* (2006.01)

(52) U.S. Cl. .................. 264/549; 264/550; 264/551

(58) Field of Classification Search .......... 264/554, 264/549, 550, 551

See application file for complete search history.

(56) References Cited

U.S. PATENT DOCUMENTS

| | | | | |
|---|---|---|---|---|
| 3,342,914 A * | 9/1967 | Edwards | ................. | 264/549 |
| 3,441,983 A * | 5/1969 | Cheney | ................. | 425/298 |
| 3,450,807 A * | 6/1969 | Cheney | ................. | 264/549 |
| 3,814,784 A * | 6/1974 | Wolf | ................. | 264/259 |
| 4,010,230 A * | 3/1977 | Repenning | ................. | 264/458 |
| 4,443,401 A * | 4/1984 | Turner | ................. | 264/544 |
| 4,582,665 A * | 4/1986 | Jabarin | ................. | 264/544 |
| 5,641,524 A * | 6/1997 | Rush et al. | ................. | 425/384 |

FOREIGN PATENT DOCUMENTS

JP 02147317 A * 6/1990

* cited by examiner

*Primary Examiner*—Edmund H. Lee
(74) *Attorney, Agent, or Firm*—John R. Benefiel

(57) ABSTRACT

A method and apparatus for thermoforming deep drawn parts such as cups in which a vacuum is momentarily applied to a preheated sheet material when overlying a clamping plate prior to clamping and advance of the plug assists to delay contact with a lip molding feature projecting from each mold cavity. This avoids a molding defect due to premature cooling of a localized region of the sheet material when the sheet material comes into contact with the lip molding features.

5 Claims, 2 Drawing Sheets

METHOD FOR THERMOFORMING

CROSS REFERENCE TO RELATED APPLICATION

The application claims the benefit of U.S. provisional Ser. No. 60/432,175, filed Dec. 11, 2002, now abandoned.

BACKGROUND OF THE INVENTION

This invention concerns thermoforming in which plastic sheet material is preheated and then advanced over a mold cavity plate, and then drawn into the mold cavities by the application of differential fluid pressure to the sheet material, as by development of a vacuum within the cavities and/or a positive pressure on the sheet material on the opposite side from the cavities. Proper stretching of the sheet material is critical to producing a properly formed part, as too much stretching in localized areas can reduce the wall thickness to an unacceptable degree. An unsightly appearance of the finished product can result from nonuniform stretching of the sheet material. Sophisticated tooling has been developed to insure proper stretching of the sheet material including clamping rings tightly engaging the sheet material surrounding each mold cavity, which are forced against the sheet material prior to thermoforming the parts. This limits the stretching of sheet material to the section secured within the clamping ring.

Another widely practiced thermoforming technique, particularly when making deep drawn parts such as disposable cups, involves the used of "plug assists", which are plug shaped members advanced into the sheet material to force it into the mold cavity prestretch the material by movement into the mold cavity prior to forming the part so as to prevent localized over stretching.

Another critical aspect of thermoforming is preventing localized cooling of the material as by contact with meal surfaces which could chill the sheet material at the point of contact, preventing proper stretching of the material around the point of contact.

The plug assists are typically constructed of syntactic foam to prevent chilling by contact of the sheet material therewith.

When thermoforming disposable drink cups, a lip is formed on the upper edge to produce a finished look. The lip is partially formed during molding by a projecting ring on the mold cavity with the sheet wrapped around the rim during thermoforming. The lip is rolled under in a subsequent lip rolling operation. Early contact with the lip ring is apt to occur during plunging of the plug assists, and this contact can cause a slight chilling of the sheet material at the point of contact, forming an irregular ridge in the sidewall as the chilled portion is drawn down into the cavity during the plug assist plunge. This is particularly apt to occur when thermoforming from thin gauge plastic fed off a roll at high speed.

Such a ridge is unsightly, particularly in clear plastic cups, and can make the release of the cups from a stack more difficult. The ridge also can interfere with printing on the cup side wall.

In an effort to avoid this problem, the projecting edge has been recessed into a "moat" feature, but this has led to difficulties in trimming, since the trim tooling must reach into the moat. Furthermore, additional sheet material is used up in the molding operation since a larger clamped circle is necessitated.

It is an object of the present invention to provide a thermoforming method and apparatus which avoids contact of the heated sheet material with lip ring edge of the mold cavity during a plug assist plunge but does not involve the use of "moats" to recess the lip ring edge.

SUMMARY OF THE INVENTION

The above object, as well as other objects which will become apparent upon a reading of the following specification and claims, are achieved by applying a momentary pulse of vacuum to the sheet in a region on the sheet side opposite the mold cavities surrounding each plug assist, so as to draw that sheet material region away from the mold lip rim and against the top of the retracted plug assists, forming a shallow dimple aligned with the mold cavity and the associated plug assist.

This shallow dimple is formed just before the plunge of the plug assists so as to delay contact of the sheet material with the lip forming mold cavity ring edge until after the plug assist plunge. This avoids formation of the irregular ridge caused by such contact with the lip forming insert rim described above.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The present invention concerns a thermoforming apparatus and process in which sheet material (either fed off a roll, extruded or precut) is advanced into a preheating station to be heated to the proper temperature, then transferred into a forming station whereat the articles are formed. The sheet material with the parts formed therein is then transferred to a trim station whereat the cups or other parts are cut free from the rest of the sheet material, using a separate press and tooling. The cups may be stacked and transferred to other operations such as lip rolling, printing, packaging, etc.

Trimming is also sometimes done in the forming station itself.

Such trimming apparatus is generally well known in the art and will not be described herein.

Figure 1:
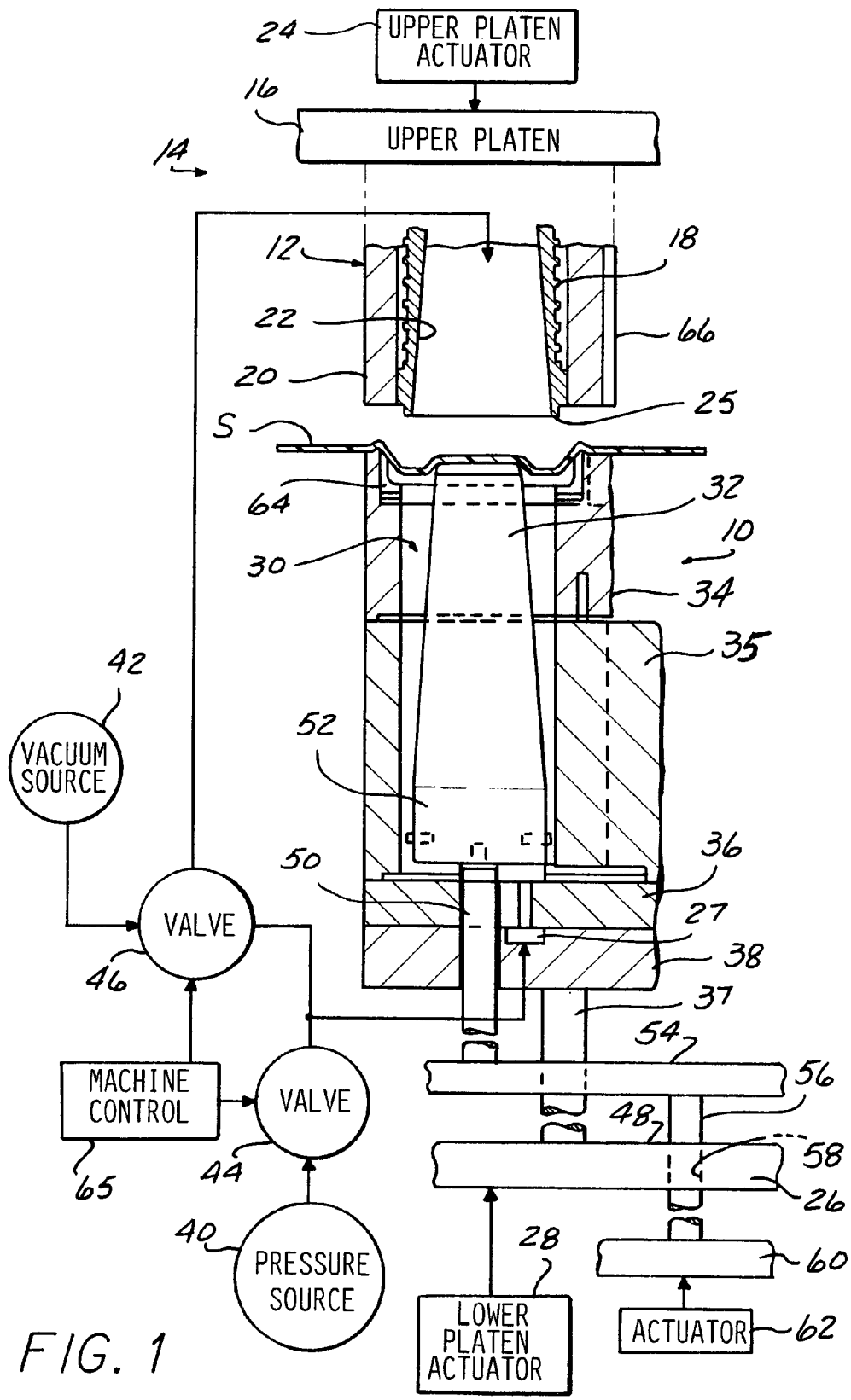
FIG. 1 is a perspective view of a tooling assembly for a thermoforming machine.
Figure 2:
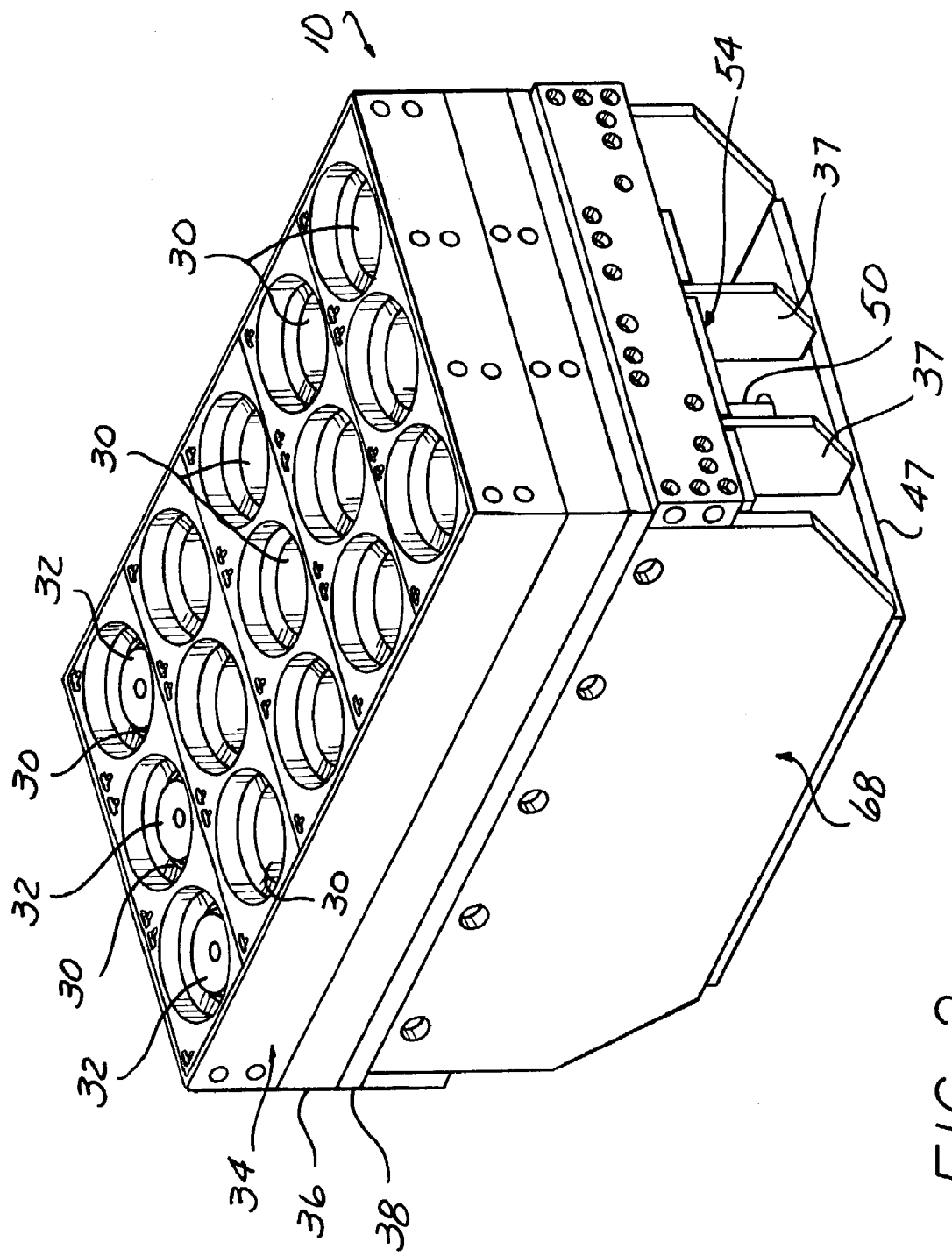
FIG. 2 is a partial vertical sectional view of a portion of the thermoforming tooling together with associated press structure and other components depicted diagrammatically, together comprising an apparatus according to the present invention.

The forming tooling includes a lower tooling assembly 10 shown separately in FIG. 2 and is preferably of the type described in copending application U.S. Ser. No. 09/996,062, filed on Nov. 28, 2001, assigned to the same assignee as the present application, and incorporated by reference herein. An upper tooling assembly 14 (FIG. 1) includes a mold plate 20 mounted in an upper platen 16.

Upper tooling assembly 14 includes an array of cavity inserts 18 secured in bores 12 in a mold, each insert defining a mold cavity 22. As described above, each insert 18 is formed with a lip 25 projecting below the lower surface of the mold plate 20 to mold a partially formed lip on the molded cup (not shown).

The upper press platen 16 is able to be lowered and raised by an actuator 24 in the well known manner.

The mold cavity 22 defines the shape of the article to be thermoformed such as a disposable plastic cup from preheated sheet material S advanced over the lower tooling assembly 10. The lower tooling assembly is mounted on a lower platen 26 able to be raised with an actuator 28.

The lower tooling assembly 10 comprises an open ended box 68 constructed of metal plates and includes an array of plug assists 32 each aligned with a respective mold cavity 20. The plug assists 32 (only three shown) are normally retracted in wells 30 defined by each one of a series of bores machined into a thick aluminum clamping plate 34 included in the lower tooling assembly 10.

The clamping plate 34 is supported on a spacer plate 35 and an assembly of one or more steel support plates 36, 38 fastened together face to face. Porting flow passages 27 machined into the abutting faces of plates 36, 38 provide manifolding for communicating air pressure or vacuum from a compressed air source 40 or vacuum source 42 into each well 30 via control valves 44, 46 depicted diagrammatically. The support plates 36, 38 are mounted by a series of stand off plates 37 facing in different directions, and secured to a bolster plate 47 forming the bottom of the box 68 and attached to the top of the lower platen 26 and the underside of the lower support plate 38.

Each plug assist 32 is secured to one end of a rod 50 received in a bottom piece 52 fixed to the lower end of each plug assist 32. The plug assists 32 are commonly constructed of syntactic foam material, such that a metal bottom piece 52 formed with a socket is required for a secure connection to the rods 50.

Each rod 50 passes through seals (not shown) to seal the wells 30, preventing leakage of air in or out of the wells 30.

The lower ends of the rods 50 are connected to a common spider plate 54, located beneath the support plates 36, 38, and also the clamp plate 34, having spaces to accommodate the standoff plates 28.

The spider plate 54 is itself connected to a set of shafts 56 extending down through bores 58 in the lower platen 26, and connected to a third platen 60 lying below the lower platen 26.

An actuator 62 is connected to the third platen 60 for vertically stroking the same, to cause the spider plate 54 to move the rods 50 and plug assists 32 up into the respective mold cavities 22 during a forming cycle to control the stretching of the preheated sheet material.

A series of annular clamping rings 64 are provided each fixed surrounding the top of a respective well 30 and each having an annular clamping edge. The clamping rings 64 are moved to clamp a region of the heated sheet material S against the lower surface of the upper tooling assembly 14 when the upper platen 24 and lower platen 26 are moved together so as to the lip engage a respective section of the sheet material S extending across the wells 30 to control the stretching of the preheated sheet material S during thermoforming, in the manner well known in the art.

In the method according to the present invention, a vacuum is momentarily applied in the sealed wells 30 after the preheated sheet material S is in position overlying the lower tooling assembly 10, by programming causing the machine control 65 to operate momentarily the valve 46 placing the wells 30 in communication with the vacuum source 42.

This causes the regions of sheet material S lying over each retracted clamping ring 64 to be drawn away from the upper mold cavity tooling 14 into said wells 30, and against the tops of the plug assists 32, as shown in FIG. 1, forming a dimpled shape within each of the clamping rings 64. Thus, as the upper platen 16 and lower platen 26 are moved together to engage the clamping rings 64, contact between the insert lip 25 and the sheet material S is delayed until after the plug assists have been extended.

The development of a vacuum in each well 30 and the dimpling of the sheet material S is quite rapid such that only a momentary operation of the valve 46 is typically necessary, on the order of a fraction of a second. This dimpling is controlled as the local areas of the sheet material S is drawn against the top of each retracted plug assist 32. The plug assists 32 do not chill the sheet material since they are constructed of syntactic foam, as mentioned above.

Furthermore, such contact is deployed as the plug assists 32 are advanced into the mold cavities 22. The machine control 65 thereafter causes the valves 44, 46 to be operated so as to communicate the vacuum source 42 with the mold cavities 22 and the air pressure source 40 to the wells 30 to form the parts in the mold cavities 22.

The plug assist 32 and the platens 24, 26 are subsequently retracted, and the sheet material S with the formed parts stripped from the mold cavities 22 as by using stripper plate 66, the formed sheet S then transferred to a trim station (not shown) for cutting the formed parts free, all in the conventional fashion.

This improved method and apparatus can be provided by a relatively simple and inexpensive modification of existing equipment and has been found to avoid the problems described above over extended production runs.

The invention claimed is:

1. In a method for thermoforming parts from preheated sheet material using a mold cavity having a lip projecting therefrom and a plug assist advanced from a retracted position into said preheated sheet to force said material of said sheet into said cavity and thereafter drawing said heated sheet material against said mold cavity and said projecting lip by fluid pressure, the improvement comprising:
   recessing said plug assist into a well in said retracted position of said plug assist aligned with said mold cavity;
   advancing said preheated sheet across a clamping ring recessed into said well and surrounding said plug assist but having an end projecting above an end of said plug assist with said plug assist in said retracted position to engage said preheated sheet and create a sealing of said well with said preheated sheet spaced slightly from said plug assist end;
   applying a vacuum in said sealed well to draw said sheet slightly into said well and against said end of said plug assist just prior to advance of said plug assist and engagement of said clamping ring with structure adjacent said mold cavity and subsequent forming of a part in said mold cavity.

2. The method according to claim 1 wherein said well is subsequently pressurized after said clamping ring is engaged and said plug assist is advanced.

3. The method according to claim 2 wherein said mold cavity is subsequently placed in communication with said vacuum source after said plug assist has been advanced and said clamping ring is engaged.

4. The method according to claim 1 wherein heated sheet material is formed with a dimple lying within each clamping ring and against the top of each plug assist shaped with an intermediate depressed ring lying between sheet portions against said plug assist end and said clamping ring.

5. The method according to claim 1 wherein said vacuum is applied only momentarily for an interval on the order of a fraction of a second.

* * * * *